United States Patent [19]

di Borgoricco

[11] Patent Number: 4,590,432
[45] Date of Patent: May 20, 1986

[54] CONSTANT-PERCENT BREAK PULSE CORRECTOR

[75] Inventor: Eugenio S. di Borgoricco, Winchester, Mass.

[73] Assignee: AT&T Bell Laboratories, Murray Hill, N.J.

[21] Appl. No.: 612,347

[22] Filed: May 21, 1984

[51] Int. Cl.[4] .......................... H04Q 1/36; H04M 3/00
[52] U.S. Cl. ..................................... 328/164; 328/120; 328/129.1; 377/28; 377/37; 377/50; 179/16 EA; 371/65
[58] Field of Search ...................... 179/16 EA, 18 EB; 328/129.1, 164, 165, 120; 377/28, 37, 50; 371/65

[56] References Cited

U.S. PATENT DOCUMENTS

| | | | |
|---|---|---|---|
| 3,504,290 | 3/1970 | Earle | 328/164 |
| 3,671,875 | 6/1972 | Pento | 328/129.1 |
| 3,818,243 | 6/1974 | McMahon | 377/28 |
| 4,227,054 | 10/1980 | Gilmer | 179/167 A |
| 4,278,842 | 7/1981 | Simmons | 179/167 A |

Primary Examiner—Stanley D. Miller
Assistant Examiner—L. L. Love, Jr.
Attorney, Agent, or Firm—Thomas Stafford

[57] ABSTRACT

Constant-percent break interval pulse correctors insure that the break interval of a dial pulse subsists for a substantially constant percentage of the total pulse interval; i.e., break interval plus make interval. The constant-percent break interval pulse correction of the first pulse in a string of pulses is realized by employing an up/down counter which is controlled to count up at a first clock rate for a first predetermined interval from the beginning of the dial pulse, then to count down at a second clock rate for a second interval from the end of the first interval to the beginning of a subsequent dial pulse and then to count down at a third clock rate until a predetermined count is reached, e.g., zero. The second clock rate is the difference between the third and first clock rates. In one embodiment, proper correction of the last dial pulse in a string of dial pulses is realized by employing a plurality of such up/down counters. A first counter is triggered by the leading edge of the first dial pulse in the string. Thereafter, each of the up/down counters is triggered by the trailing edge of the prior dial pulse being corrected.

15 Claims, 8 Drawing Figures

TABLE 1

| STATES AND ACTIONS ||||
| STATE | COUNTER 11 | COUNTER 12 | COUNTER 13 | COUNTER 14 |
|---|---|---|---|---|
| $ | empty | empty | empty | empty |
| # | down by 3 | up by 3 | empty | up by 3 |
| A | empty | down by 2 | empty | up by 3 |
| B | down by 3 | up by 3 | up by 3 | up by 3 |
| C | empty | down by 2 | up by 3 | up by 3 |
| D | down by 3 | down by 5 | up by 3 | empty |
| E | down by 3 | down by 5 | hold | up by 3 |
| F | down by 3 | empty | up by 3 | empty |
| G | down by 3 | empty | hold | up by 3 |
| H | empty | empty | down by 2 | empty |
| I | empty | empty | down by 5 | up by 3 |
| J | down by 3 | empty | down by 5 | up by 3 |
| K | down by 3 | up by 3 | down by 5 | hold |
| L | down by 3 | empty | empty | up by 3 |
| M | down by 3 | up by 3 | empty | hold |
| N | empty | empty | empty | down by 2 |
| O | empty | up by 3 | empty | down by 5 |
| P | down by 3 | up by 3 | empty | down by 5 |
| Q | down by 3 | hold | up by 3 | down by 5 |
| R | down by 3 | up by 3 | empty | empty |
| S | down by 3 | hold | up by 3 | empty |
| T | empty | down by 2 | empty | empty |
| U | empty | down by 5 | up by 3 | empty |
| V | empty | empty | up by 3 | empty |
| W | empty | hold | empty | hold |
| X | down by 3 | empty | empty | empty |
| Y | empty | up by 3 | empty | empty |
| Z | empty | empty | empty | up by 3 |

FIG. 8

TABLE 2

| TRANSITIONS AND TRIGGERS ||
|---|---|
| TRANSITION | TRIGGER EVENT |
| $# | Begin Dial Pulse |
| #A | Counter 11 reaches 0 |
| #B | End Dial Pulse |
| AC | End Dial Pulse |
| AW | Counter 14 reaches max count |
| BC | Counter 11 reaches 0 |
| CD | Begin Dial Pulse |
| C$ | Counter 14 reaches max count |
| DE | End Dial Pulse |
| DF | Counter 12 reaches 0 |
| EG | Counter 12 reaches 0 |
| FG | End Dial Pulse |
| FH | Counter 11 reaches 0 |
| GI | Counter 11 reaches 0 |
| HI | End dial pulse |
| IJ | Begin Dial Pulse |
| IZ | Counter 13 reaches 0 |
| JK | End Dial Pulse |
| JL | Counter 13 reaches 0 |
| KM | Counter 13 reaches 0 |
| LM | End Dial Pulse |
| LN | Counter 11 reaches 0 |
| MO | Counter 11 reaches 0 |
| NO | End Dial Pulse |
| OP | Begin Dial Pulse |
| OY | Counter 14 reaches 0 |
| PQ | End Dial Pulse |
| PR | Counter 14 reaches 0 |
| QS | Counter 14 reaches 0 |
| RS | End Dial Pulse |
| RT | Counter 11 reaches 0 |
| SU | Counter 11 reaches 0 |
| TU | End Dial Pulse |
| UD | Begin Dial Pulse |
| UV | Counter 12 reaches 0 |
| V$ | Counter 13 reaches max count |
| WX | End Wink |
| X$ | Counter 11 reaches 0 |
| Y$ | Counter 12 reaches max count |
| Z$ | Counter 14 reaches max count |

CONSTANT-PERCENT BREAK PULSE CORRECTOR

TECHNICAL FIELD

This invention is related to pulse regeneration and correction and, more particularly, to dial pulse correction.

BACKGROUND OF THE INVENTION

Numerous circuits and systems employ pulse signals to initiate, activate, or otherwise control circuit and/or system functions. Most often the pulse signals are required to be within specified limits as to duration, duty cycle and the like. In telecommunications systems, for example, pulse signals are employed for numerous purposes. Supervisory signals which include, among others, dial pulses and wink signals are of particular interest.

One characteristic of dial pulses which is of particular importance is the so-called break interval and its percentage of the overall dial pulse interval, i.e., break interval plus make interval. As is known, dial pulses may be received which vary in repetition rate from some minimum, for example, 7.5 pulses per second (PPS), to some maximum, for example, 12 PPS. It is important in certain applications that the percentage of the break interval of the individual dial pulses be substantially constant relative to the overall dial pulse interval over a desired range of incoming dial pulse rates.

One prior constant-percent break dial pulse corrector is disclosed in U.S. Pat. No. 4,227,054 issued to J. L. Gilmer on Oct. 7, 1980. A problem with this prior arrangement is that it requires a plurality of counters to realize the constant-percent break pulse correction for each of the dial pulses. Additionally, the prior arrangement fails to provide for correcting the last pulse in the dial pulse string.

SUMMARY OF THE INVENTION

The problems of prior constant-percent break pulse correctors are overcome, in accordance with an aspect of the invention, by employing a single up/down counter to correct a corresponding pulse and by employing a pluality of up/down counters to correct a string of pulses. One of the up/down counters is triggered by a leading edge of the first pulse in the string of pulses to count up at a first predetermined clock rate for a first predetermined interval, then caused to count down at a second predetermined clock rate for a second interval beginning at the end of the first interval and ending with the leading edge of a next subsequent pulse and, then, caused to count down at a third predetermined clock rate until a predetermined count is reached. The second predetermined clock rate being determined in accordance with a predetermined relationship between the first and third clock rates.

In one embodiment, the problem of correcting the last pulse in a string of pulses is overcome, in accordance with another aspect of the invention, by employing a plurality of up/down counters in conjunction with a delay unit. The delay unit generates the first predetermined interval and one of the up/down counters operates as described above in correcting the first dial pulse. However, after the first pulse the up/down counters operate to count up at the first clock rate from the trailing edge of a last previous pulse until either the first interval beginning from the leading edge of the pulse being corrected has terminated or the trailing edge of the dial pulse being corrected occurs, whichever occurs first. If the first interval terminates prior to the occurrence of the trailing edge of the pulse, the up/down counter counts down at the second clock rate until the trailing edge of the pulse occurs and, then, counts down at the third clock rate until the predetermined count is reached. If the trailing edge of the pulse being corrected occurs before the termination of the first interval, the up/down counter is inhibited from further counting until the termination of the first interval and, then, counts down at the third clock rate until the predetermined count is reached.

BRIEF DESCRIPTION OF THE DRAWING

The invention will be more fully understood from the following detailed description of an illustrative embodiment when taken in connection with the appended figures in which.

DETAILED DESCRIPTION

Figure 1:
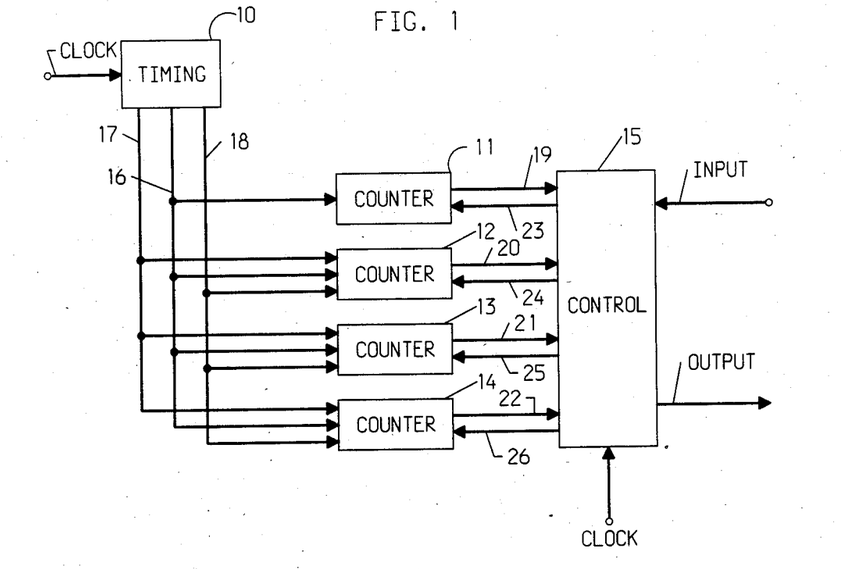
FIG. 1 shows in simplified block diagram form a digital constant-percent break interval pulse corrector including an embodiment of the invention.

FIG. 1 shows in simplified block diagram form a digital constant-percent break interval pulse corrector including an embodiment of the invention. The purpose of this embodiment is to generate dial pulses having a constant percent break interval and, additionally, to properly correct the last dial pulse in a string of dial pulses. In this example, dial pulses having incoming rates from approximately 7.5 pps to 12 pps are corrected to have a percent break of approximately 60 percent. Accordingly, shown in FIG. 1 are timing generator 10, counter 11, up/down counter 12, up/down counter 13, up/down counter 14 and control unit 15.

An appropriate system CLOCK signal is supplied to timing generator 10 and to control unit 15. The CLOCK is used in control unit 15 for synchronization purposes. In this example, CLOCK is a 64 kilohertz signal. Timing generator 10 in response to CLOCK generates, in well known fashion, a first predetermined clock rate, in this example, 3 kilohertz, a second predetermined clock rate, in this example, 2 kilohertz, and a third predetermined clock rate, in this example, 5 kilohertz. It is noted that the second clock rate is determined in accordance with a predetermined relationship between the first and second clock rates, namely, that the second clock rate is the difference between the first and third clock rates. The reason for this relationship will become apparent from the following description. It is also noted that in this embodiment none of the three clock signals have pulse transistions that occur simultaneously and that the pulses are not uniformly disbursed. This eliminates the possibility of race conditions and simplifies the control unit 15. The 3 kilohertz clock signal is supplied via circuit path 16 to counter 11, and up/down counters 12, 13 and 14. The 2 kilohertz clock signal is supplied via circuit path 17 to up/down counters 12, 13 and 14. The 5 kilohertz signal is supplied via circuit path 18 to up/down counters 12, 13 and 14.

Outputs from counter 11, and up/down counters 12, 13 and 14 are supplied via circuit paths 19, 20, 21 and 22, respectively, to control unit 15 and control signals from control unit 15 are supplied via circuit paths 23, 24, 25 and 26 to counter 11, and up/down counters 12, 13 and 14, respectively.

Incoming pulses to be corrected are supplied to the input of control unit 15 and the desired corrected pulses are developed at its output.

Counter 11 is a down counter which is employed to obtain a fixed delay interval. The delay interval is required to insure that the generation of the corrected pulse is not completed prior to the end of the input pulse period. As discussed below, this insures that the desired 60 percent break interval is obtained. In this example, a 80 millisecond delay is obtained by setting counter 11 to an initial count of 240 and counting down to zero at the 3 kilohertz rate.

Figure 2:
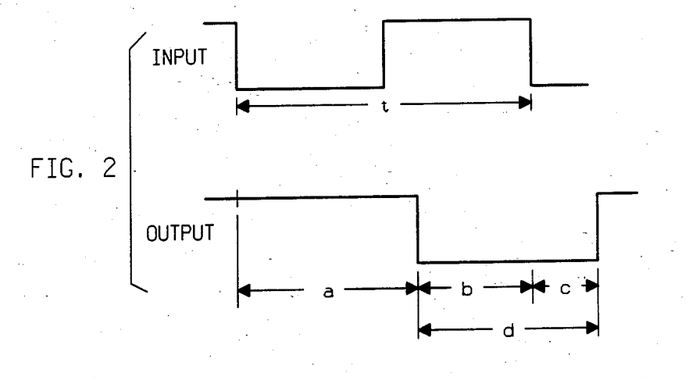
FIG. 2 depicts waveforms useful in describing the operation of the invention for correcting the first dial pulse in a string of pulses.

Operation of up/down counter 12 in conjunction with counter 11 to obtain the desired 60 percent break for the first dial pulse in a string of dial pulses is best explained by referring to FIG. 2. Shown in FIG. 2 is an input dial pulse to be corrected having period t and a delayed corrected output dial pulse having a break interval d which is 60 percent of period t. In this example, it is assumed that the input pulse is the first pulse in a string of pulses to be corrected. Consequently, counter 11 and, for example, up/down counter 12 are triggered by the leading edge of the input pulse, i.e., the first negative-going transition. Counter 11 counts down at the first clock rate, i.e., 3 kilohertz, to generate a first predetermined interval a, in this example, a delay interval of 80 milliseconds. Similarly, counter 12 counts up during interval a also at the first clock rate of 3 kilohertz. In order to realize the desired 60 percent break interval, counter 12 should count up at the 3 kilohertz rate for an interval equal to period t and count down at the third clock rate, i.e., 5 kilohertz for interval d, where intervals t and d overlap. This is relaized with one up/down counter, in accordance with an aspect of the invention, by causing counter 12 to count down during overlap interval b, at the second clock rate, which, in this example, is the difference between the third and first clock rates or 2 kilohertz. Then, counter 12 is caused to count down at the third clock rate, i.e., 5 kilohertz, until a predetermined count is reached, in this example, a count of zero to obtain interval c. Thus, in summary, counter 11 generates delay interval a and counter 12 counts up at the 3 kilohertz rate during interval a, then counter 12 counts down at the 2 kilohertz rate during interval b which is from the termination of interval a to the end of the input dial pulse period t and, thereafter, counter 12 counts down at the 5 kilohertz rate until it reaches zero to yield an output dial pulse having the desired 60 percent break interval d.

Figure 3:
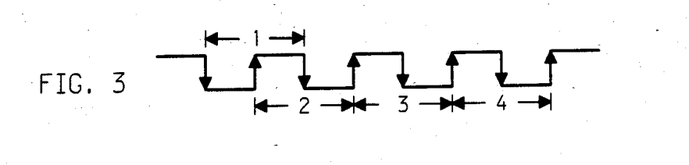
FIG. 3 shows a sequence of pulses also useful in describing operation of the invention.

FIG. 3 shows a string of dial pulses to be corrected. As indicated above, the first dial pulse is corrected by up/down counter 12 and the correction cycle is initiated on the leading edge of the first dial pulse. The second dial pulse is corrected by up/down counter 13 and the correction cycle is initiated on the trailing edge of the first pulse. The period t of the second pulse is determined from the trailing edge of the first pulse to the trailing edge of the second pulse. The third and fourth pulses are correncted by up/down counters 14 and 12, respectively.

Figure 4:
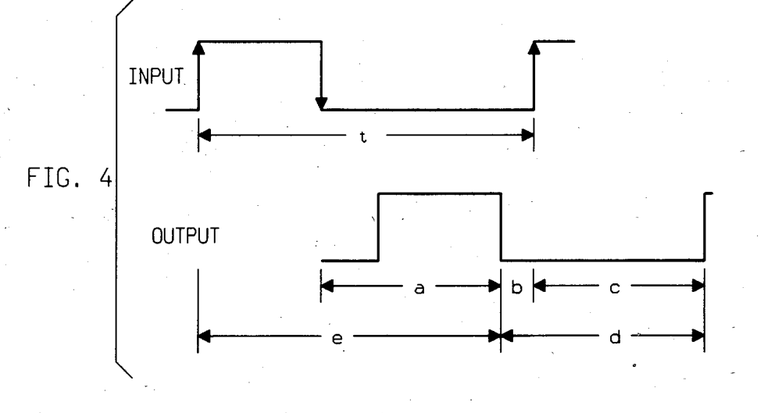
FIG. 4 depicts waveforms useful in describing the operation of the invention for correcting pulses after the first one in a string of pulses.

The operation of counters 12, 13 and 14 in conjunction with the delay interval generated by counter 11 is best explained with reference to FIG. 4 for wide pulses, i.e., delay interval a terminating before the end of the break interval of the incoming pulse, and FIG. 5 for narrow pulses, i.e., the delay interval a terminating after the end of the break interval. Thus, FIG. 4 shows an incoming pulse of period t having a "wide" break interval. The output pulse is generated by, for example, up/down counter 13 being caused to count up from the trailing edge of a last previous pulse at the 3 kilohertz rate until the termination of delay interval a generated by counter 11, i.e., for interval e, then count down at the 2 kilohertz rate until the trailing edge occurs of the pulse being corrected, i.e., for interval b and, then, to count down at the 5 kilohertz rate from the trailing edge of the pulse being corrected until the predetermined count of zero is reached to generate an output pulse having break interval d which is 60 percent of pulse period t.

Figure 5:
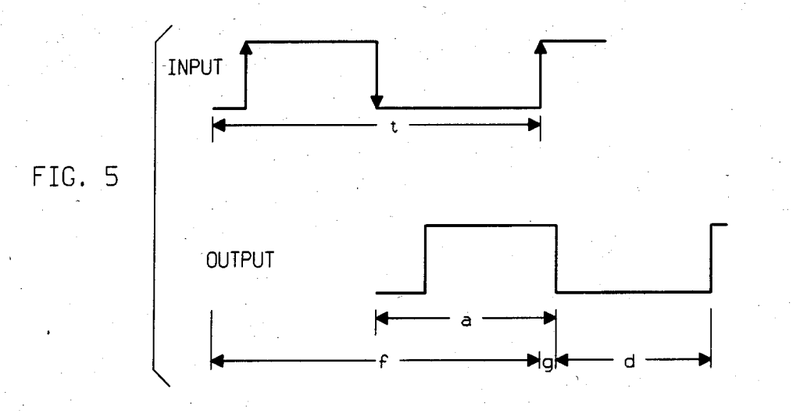
FIG. 5 also shows waveforms useful in describing operation of the invention for correcting dial pulses after the first pulse in a string of pulses.

Similarly, FIG. 5 shows an incoming pulse of period t and an output pulse which also may be generated by up/down counter 13. Counter 13 is caused to count up at the 3 kilohertz rate from the trailing edge of a previous pulse until the trailing edge of the pulse being corrected. Then, further counting is inhibited until the termination of delay interval a, i.e., for interval g and, then, counter 13 is caused to count down at the 5 kilohertz rate until a zero count is reached, thereby generating break interval d which is the desired 60 percent of pulse period t.

Thus, it is seen by "measuring" the period of the pulses subsequent to the first pulse in the string from the trailing edge of a previous pulse to the trailing edge of the pulse being corrected the last pulse in the string is corrected to the desired constant percent break value.

Figure 6:
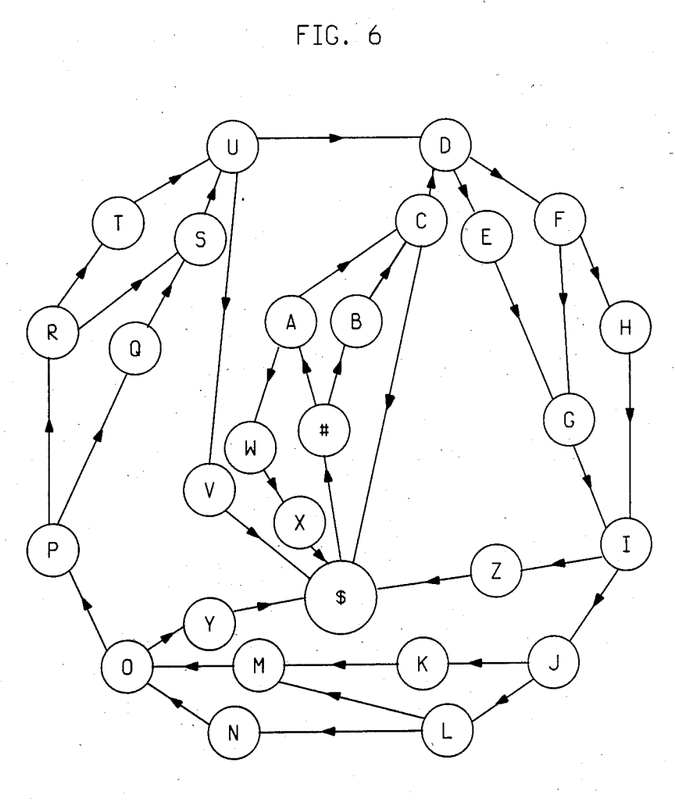
FIG. 6 is a state diagram illustrating the operation of the control unit shown in FIG. 1.

Operation of control unit 15 in controlling operation of counter 11 and up/down counters 12, 13 and 14 to realize the desired pulse corrections, in accordance with the invention, is shown in the state diagram of FIG. 6. The states and actions of the elements of the diagram of FIG. 6 are described in Table 1 of FIG. 7 and the transistions and events triggering the transitions from state to state are described in Table 2 of FIG. 8. Sequential logic circuits of this type are commonly known as finite state machines which respond to inputs supplied thereto to provide a discrete permutation of conditions to its outputs. Such finite state machines or sequential machines are well known in the art and it will be apparent to those skilled in the art to readily design appropriate logic circuits from the information shown in FIGS. 6, 7 and 8. Such arrangements are described for example in Chapter 3 of *Sequential Machines and Automata Theory*, by T. L. Booth, John Wiley and Sons, Inc., Copyright 1968. See also, Chapters 2 and 9 of *Introduction to Switching and Automata Theory*, by M. A. Harrison, McGraw Hill, Copyright 1965.

It is noted that a "narrow" pulse is defined as one such that delay interval a terminates after the trailing edge of the pulse being corrected occurs and that a "wide" pulse is defined as one such that delay interval a terminates before the trailing edge of the pulse being corrected occurs.

Figure 7:
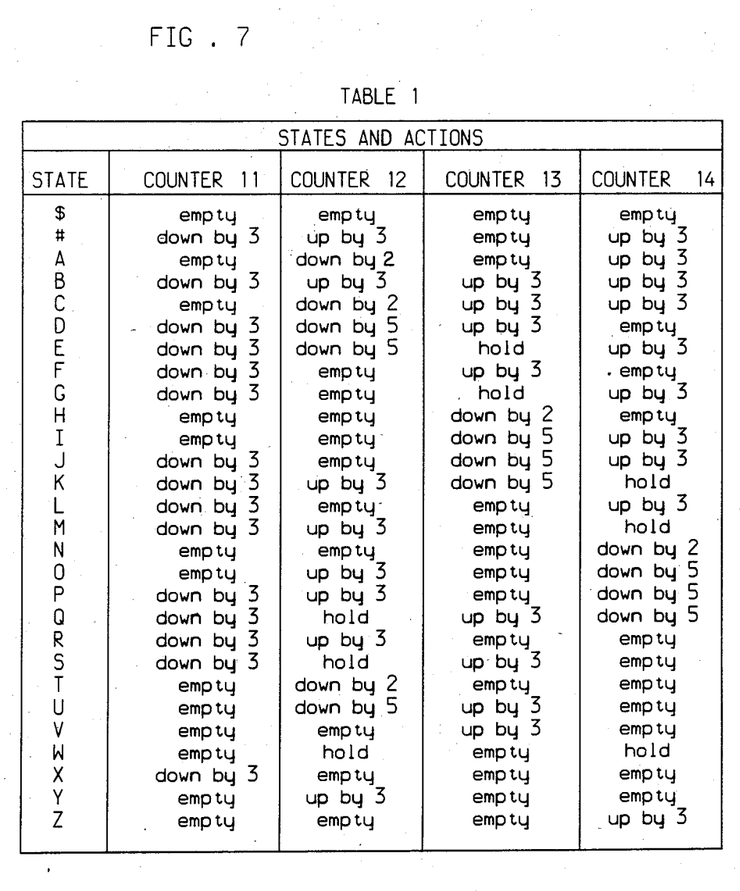
FIG. 7 is TABLE 1 which includes the states and actions of the state diagram of FIG. 4.
Figure 8:
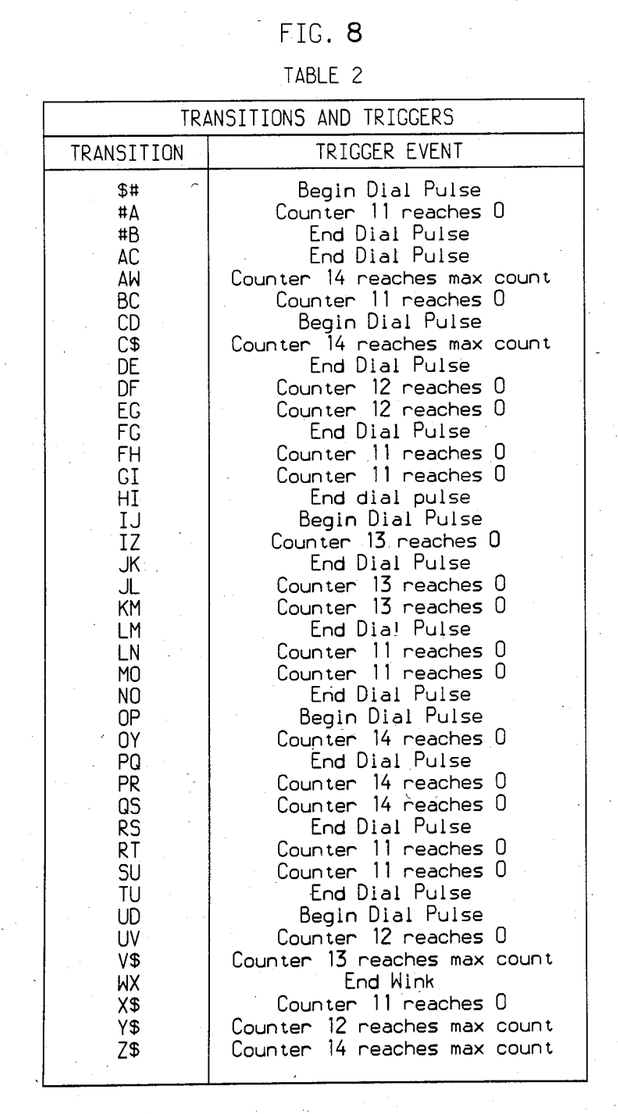
FIG. 8 is TABLE 2 which includes the transitions in the states of the state diagram of FIG. 4 and the trigger events which cause those transitions.

The sequence of states for the first pulse in a string of pulses as controlled by control unit 15 and shown in FIGS. 6, 7 and 8 are as follows:

for a narrow pulse, the states of $#BC; and
for a wide pulse, the states of $#AC.

The leading edge of the next pulse in the string takes the corrector into state D. For pulses after the first pulse, i.e., the steady state operation, the states which the corrector cycles through as controlled by control unit 15 and shown in FIGS. 6, 7 and 8 are as follows:

for wide pulses, the states of D F H I J L N O P R T U D;
for narrow pulses, the state of D E G I J K M O P Q S U D; and
for medium pulses, the states of D F G I J L M O P R S U D.

A medium pulse is defined essentially the same as a narrow pulse. However, the states are different because different operations take place while the count is inhibited for a longer interval before counting down at the third rate of 5 kilohertz for the narrow pulses.

The operation of the corrector at the end of the pulse string is that the corrector reaches one of states I, O or U. The last pulse is not followed by a subsequent pulse. Consequently, the steady-state operation is interrupted and the corrector is controlled via control unit 15 as shown in FIGS. 6, 7 and 8 to follow one of the following sequences of states:

I Z $,
O Y $, or
U V $.

The corrector remains in the idle state $ until the next pulse or string of pulses to be corrected are received.

When a single dial pulse occurs, counter 14 will reach a maximum and the state transition is from C to $.

A pulse that is wider than the acceptable range for dial pulses is interpreted as a wink signal. Wink signals are passed with an 80 millisecond delay but with no change in shape. This is achieved by the following sequence of states: $ # A W X $. The wink is recognized when the counter 14 reaches its maximum count. Then, state X introduces an 80 millisecond delay at the trailing edge of the wink so that both the leading and trailing edges are delayed by the same amount and the wink is passed without correction.

The above arrangement is only an example of an embodiment of the invention and it will be apparent to those skilled in the art that various changes in form and detail may be made without departing from the spirit and scope of the invention. For example, the number of up/down counters may in some applications be more or less than the number shown herein depending on the range of pulses to be corrected.

What is claimed is:

1. A constant-percent break interval pulse corrector comprising,
   means for generating a delay interval initiated from the leading edge of a pulse being corrected,
   means for generating a plurality of clock signals each at a predetermined clock rate,
   at least one up/down counter being supplied with said plurality of clock signals, and
   means responsive to a pulse to be corrected and outputs from said delay interval generating means and said at least one up/down counter for generating control signals to cause said at least one up/down counter to count up at a first predetermined clock rate for an interval equal to said delay interval, to count down at a second predetermined clock rate from the end of said delay interval until a leading edge of a next subsequent pulse to be corrected occurs and then to count down at a third predetermined clock rate until a predetermined count is reached, wherein the break interval of the corrected pulse is the interval from the end of said delay interval to said up/down counter reaching said predetermined count.

2. The invention as defined in claim 1 further including at least a second up/down counter and wherein said control signal generating means generates control signals for causing said at least second up/down counter to count up at said first predetermined rate and if said at least second up/down counter reaches a predetermined count prior to the occurrence of a subsequent pulse to be corrected the break interval of the pulse being corrected is terminated as being a single pulse.

3. The invention as defined in claim 1 wherein said second predetermined clock rate is determined in accordance with a predetermined relationship between said third and first predetermined clock rates.

4. The invention as defined in claim 3 wherein said second predetermined clock rate is the difference between said third and first predetermined clock rates.

5. The invention as defined in claim 4 wherein said predetermined count is zero.

6. The invention as defined in claim 5 wherein said pulse being corrected has a make interval and break interval, and the corrected pulse has a break interval that is nominally 60 percent of the make plus break intervals of the corresponding pulse being corrected.

7. A constant-percent break interval pulse corrector comprising,
   means for generating a delay interval initiated from the leading edge of each pulse in a string of pulses to be corrected,
   means for generating a plurality of clock signals, each at a predetermined clock rate,
   a plurality of up/down counters each being supplied with said plurality of clock signals, and
   means responsive to said pulses to be corrected and outputs from said delay interval generating means and said plurality of up/down counters for generating control signals to cause one of said plurality of counters in response to the first pulse in the string of pulses to count up at a first predetermined clock rate for an interval equal to said delay interval, then to count down at a second predetermined clock rate from the end of said delay interval until a leading edge of a next subsequent pulse in the string occurs and then to count down at a third predetermined rate until a predetermined count is reached, and to cause ones of said plurality of up/down counters used for correcting subsequent ones of said pulses in said string of pulses to count up at said first clock rate from the trailing edge of the last previous pulse being corrected either until the termination of the delay interval corresponding to the pulse being corrected or until the trailing edge of the pulse being corrected occurs whichever occurs first, when the delay interval terminates prior to the occurrence of the trailing edge of the pulse being corrected the up/down corrector is caused to count down at the second clock rate until the trailing edge of the pulse being corrected occurs and then to count down at the third clock rate until the predetermined count is reached, when the trailing edge of the pulse being corrected occurs prior to the termination of the delay interval the up/down counter is inhibited from further counting until the end of the delay interval and then caused to count down at the third clock rate until the predetermined count is reached.

8. The invention as defined in claim 7 wherein said second predetermined clock rate is determined in accordance with a predetermined relationship between said third and first predetermined clock rates.

9. The invention as defined in claim 7 wherein said second predetermined clock rate is the difference between said third and first predetermined clock rates.

10. The invention as defined in claim 7 wherein said plurality of up/down counters includes at least two up/down counters.

11. The invention as defined in claim 10 wherein said plurality of up/down counters includes at least a third up/down counter.

12. The invention as defined in claim 11 wherein said predetermined count is zero.

13. The invention as defined in claim 12 wherein said control means further generates control signals for correcting a single incoming pulse by causing a third one of said up/down counters to count up at the first predetermined clock rate from the leading edge of the first pulse in the string of pulses and when the third up/down counter reaches a predetermined count the pulse being corrected is terminated as being a single pulse.

14. The invention as defined in claim 13 wherein each of the pulses to be corrected has a make interval and a break interval and the resulting corrected pulses each has a break interval that is nominally 60 percent of the make plus break intervals of the corresponding pulse being corrected.

15. The invention as defined in claim 14 wherein said clock signal generating means generates said first predetermined clock signal at a three kilohertz rate, said second predetermined clock signal at a two kilohertz rate and said third predetermined clock signal at a five kilohertz rate.

* * * * *

UNITED STATES PATENT AND TRADEMARK OFFICE
CERTIFICATE OF CORRECTION

PATENT NO. : 4,590,432

DATED : May 20, 1986

INVENTOR(S) : Eugenio S. di Borgoricco

It is certified that error appears in the above—identified patent and that said Letters Patent is hereby corrected as shown below:

On the first page of the patent on the line below the line identified as United States Patent [19], "di Borgoricco" should read --Sartori di Borgoricco--.

On the line identified as [75] Inventor: "Eugenio S. di Borgoricco" should read --Eugenio Sartori di Borgoricco--.

Signed and Sealed this

Fourth Day of November, 1986

[SEAL]

Attest:

DONALD J. QUIGG

Attesting Officer

Commissioner of Patents and Trademarks